United States Patent [19]

Scharrer et al.

[11] Patent Number: 5,885,004
[45] Date of Patent: Mar. 23, 1999

[54] HYDROSTATICALLY SUPPORTED FOIL BEARING

[75] Inventors: Joseph K. Scharrer, Fair Oaks; Robert F. Beatty, West Hills, both of Calif.

[73] Assignee: Boeing North America, Inc., Seal Beach, Calif.

[21] Appl. No.: 979,357

[22] Filed: Nov. 12, 1997

[51] Int. Cl.[6] .................................................. F16C 17/03
[52] U.S. Cl. .............................................. 384/99; 384/103
[58] Field of Search ............................. 384/99, 103, 104, 384/106, 105

[56] References Cited

U.S. PATENT DOCUMENTS 3,765,732  10/1973  Watt .
5,518,320   5/1996  Mohammed et al. ................... 384/103
5,531,522   7/1996  Ide et al. ................................. 384/99

*Primary Examiner*—Lenard A. Footland
*Attorney, Agent, or Firm*—Harry B. Field; Steven E. Kahm

[57] ABSTRACT

A foil bearing is used wherein the support for the foils are hydrostatically rather than mechanical spring supported. The bearing housing has a plurality of orifices for admitting hydrostatic fluid over the foils. The foils are then supported by the hydrostatic fluid. The hydrostatic foil bearing is stiffer, longer lasting, and easier to assemble than foil bearings with mechanical spring backings. Hydrostatically supported foil bearings also have variable spring rates depending on the pressure of the hydrostatic fluid, thus allowing the hydrostatic foil bearing to have adjustable capacity with speed. In addition the hydrostatic foil bearing damping between the rotor and housing is greater than foil bearings with mechanical spring backing.

2 Claims, 2 Drawing Sheets

HYDROSTATICALLY SUPPORTED FOIL BEARING

BACKGROUND OF THE INVENTION

1. Field of the Invention

This invention relates to foil bearings and more particularly to utilizing a hydrostatic backup support for the foil in the foil hydrostatic bearing instead of a mechanical spring.

2. Description of the Related Art

Foil hydrostatic bearings employ foils for contacting a journal at zero to low speed operation. On the other side of the foil there is a high spring rate, hydrostatic fluid film between the housing and the foil. In a conventional foil bearing there is a low spring rate mechanical spring that pushes on the foil, to center or position the journal. The compliance of the low spring rate mechanical spring supporting the foils circumferencially 360° enables it to position the rotor relative to the housing to define a static position before operation is initiated. It also enables the bearing foil to conform to some extent to misaligned and thermally distorted shaft loads.

Typically a foil bearing is used in light, small machines that operate at high speed and are used to pump low density and low viscosity fluids such as air. High viscosity fluids produce a shear load to fail the foil attachment points. Foil bearings have a low load capacity due to the hydrodynamic characteristics of the fluid at relatively low pressure and fixed geometry (length and diameter). As machines become larger and the density of the fluids pumped increases, the side loads experienced by the bearings at off design conditions increases. If the loads exceed the capacity of the bearings the bearings will fail.

The low spring rate mechanical backup springs limit the amount of force that can be applied to the bearing before it fails.

SUMMARY OF THE INVENTION

This invention provides for replacement of the low spring rate mechanical springs as a back up structure for the foils in a foil bearing with a hydrostatic fluid film between the foils and housing support. The hydrostatic back up support of the foils in combination with the conventional hydrodynamic support on the bore of the foils produce a combined higher capacity bearing to operate in a larger machine at off normal conditions and carry a higher sideload. A further benefit is the ability to add a hydrostatic fluid film to the foil bearing that increases the bearing's damping to make it more useful in high speed machinery that operates above the lowest critical speed. The hydrostatic support of the foil is a stability aid to improve the rotordynamic response.

OBJECTS OF THE INVENTION

It is an object of the invention to increase the load capacity of foil bearings.

It is also an object of the invention to improve the damping characteristics of foil bearings.

It is an object of the invention to produce foil bearings which are more robust.

It is an object of the invention to provide a foil bearing which is easier to assemble.

It is an object of the invention to eliminate mechanical backup springs and tuning operations of the springs in a foil hydrostatic bearing.

It is a further object of the invention to provide a stiffer back up support for the foil in the bearing.

Other objects, advantages and novel features of the present invention will become apparent from the following detailed description of the invention when considered in conjunction with the accompanying drawing.

DETAILED DESCRIPTION OF THE PREFERRED EMBODIMENT

Figure 1:
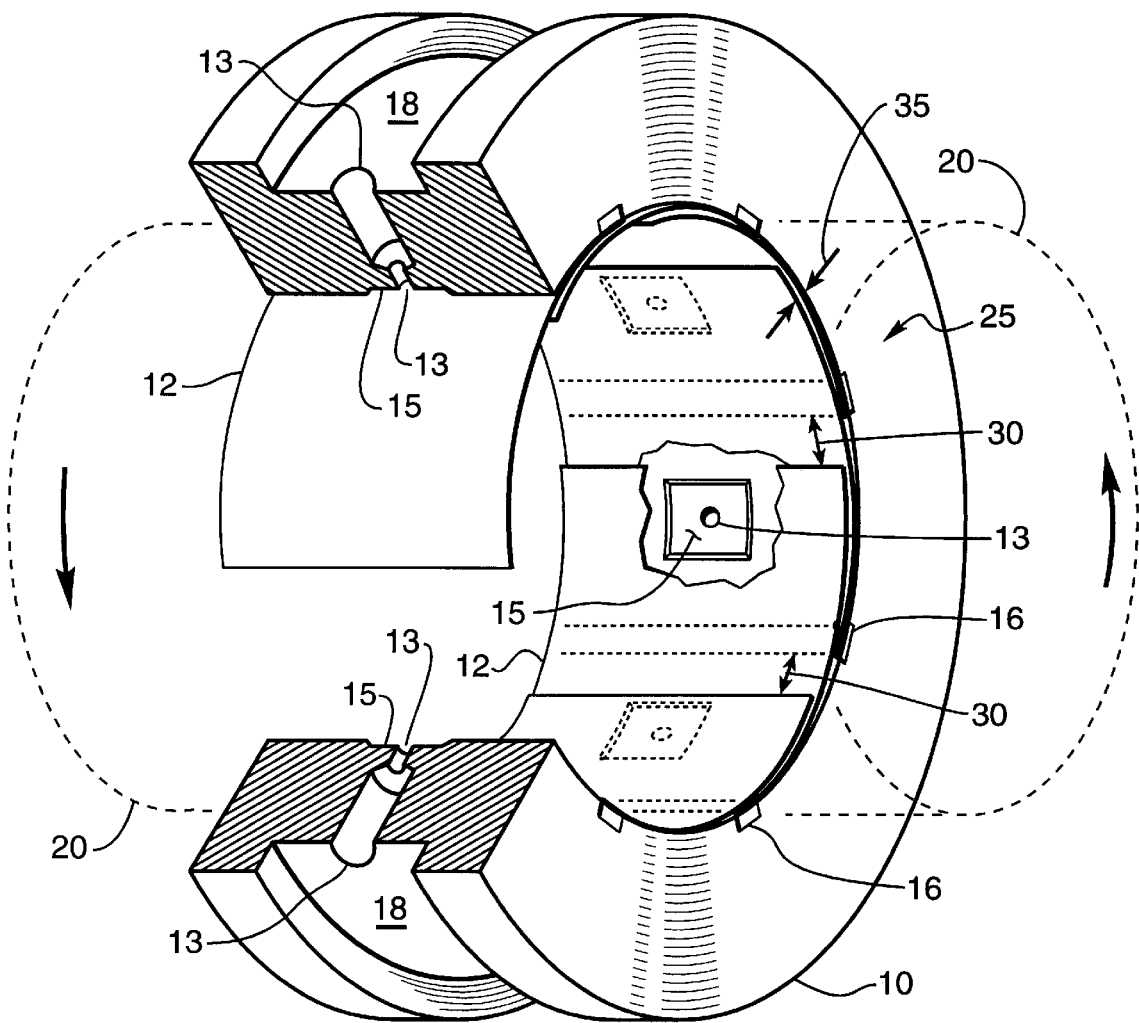
FIG. 1 is a cross sectional view of the hydrostatically supported foil bearing.

The hydrostatically supported foil bearing eliminates the backup springs behind the foil on a typical foil bearing and replaces the springs with hydrostatic film support.

The housing 10 for the hydrostatically supported foil bearing has a series of orifices 13 for introducing a hydrostatic fluid to support the foils 12 which in turn support the journal 20.

On the outer diameter of the housing 10 there is a common feed manifold 18 for introducing hydrostatic fluid to the hydrostatic bearing orifices 13, one bearing orifice 13 per foil 12. The hydrostatic fluid enters the bearing radially in orifices 13 to recess 15 on the inner diameter of the bearing to supply a pressurized fluid film during operation. During operation the bearing is submerged and wetted with the hydrostatic fluid. Under the rotation of the journal 20 at start up, a hydrodynamic film is created in the space between the journal 20 and the bore 25 of the foils 12 that builds up as the speed of the journal 20 increases and is proportional to the fluid viscosity. The bearing capacity is a function of the viscosity of the fluid times the journal rotation speed to produce a hydrodynamic lift and insure that the journal 20 does not touch the bore 25 of the bearing or the surface of the foil 12. Thus the hydrostatic foil bearing is a low wear bearing wherein the hydrostatic foil bearing does not wear out the clearances and degrade the bearing with time.

Figure 2:
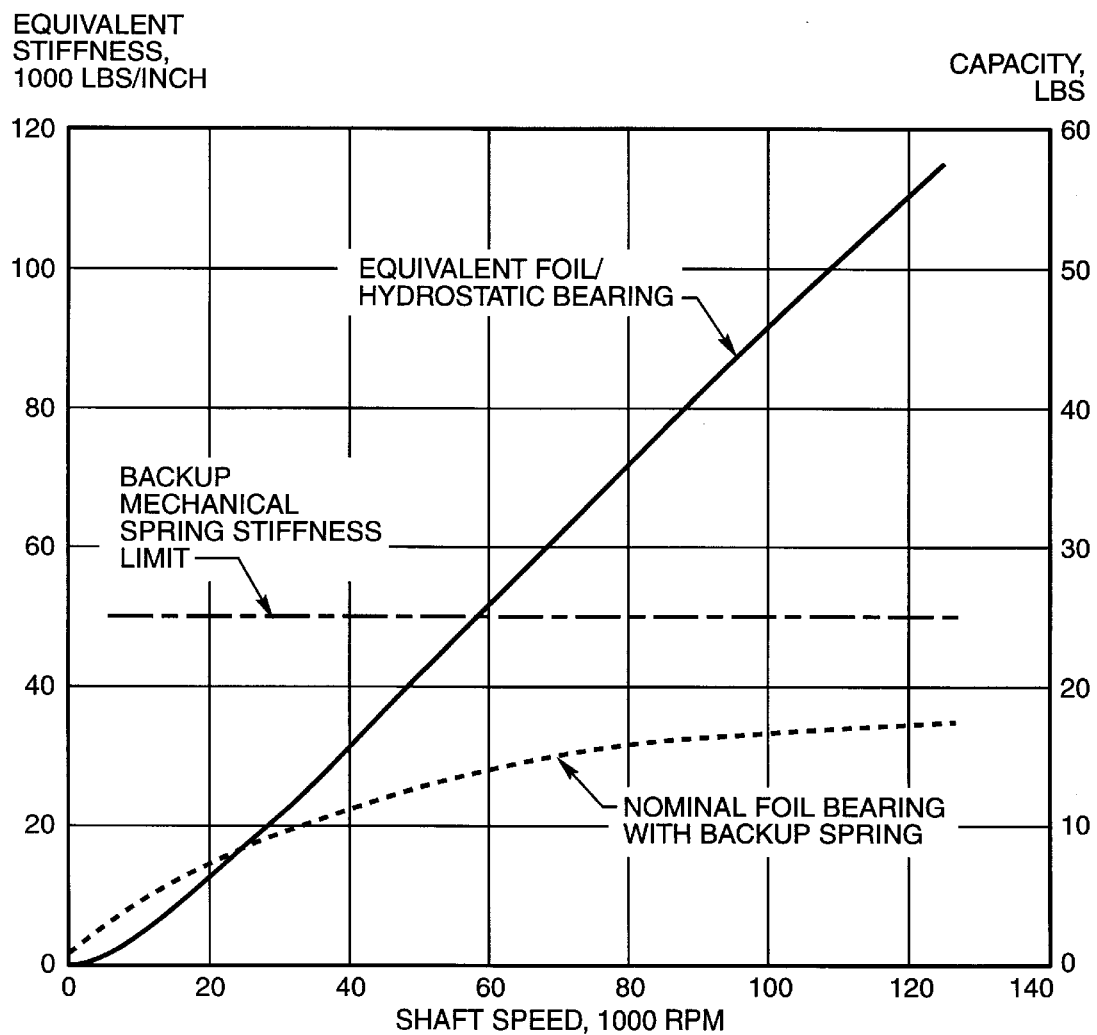
FIG. 2 is a graph comparing the bearing capacity and stiffness of a hydrostatically supported foil bearing to a mechanical spring foil bearing as a function of shaft speed.

During operation, as the pump fluid increases its output pressure, a secondary flow from the pump discharge is delivered to the bearing in the common feed manifold 18 which pressurizes the orifices 13 for a flow on the outer diameter of the foil 12 that is under high pressure thereby hydrostatically supporting the foil 12. The hydrostatic support of the foil outer diameter plus the normal hydrodynamic support of the foil inner diameter combine to form a very stiff support for journal 20. As the speed of the journal 20 increases the load capacity of the bearing increases. The hydrostatic foil bearing is therefore capable of handling more fixed radial load than a typical foil bearing can with a geometry controlled mechanical spring support. A graph comparing the bearing capacity and stiffness of a hydrostatically supported foil bearing to a mechanical spring foil bearing as a function of shaft speed is shown in FIG. 2. The springs in the typical foil bearing have a fixed value that does not increase with the speed of the journal thus limiting mechanical spring backup foil bearing capacity and stiffness.

A secondary benefit of the hydrostatic foil bearing is that under pressurization the hydrostatic fluid film produces a viscous damping force that greatly improves the damping of the device such that a stability aid for supercritical machinery is created. It extends the dynamic life of the of the hydrostatic foil bearing and thus the machine it is installed in. The sway space 35 between the foils 12 and the bore of the bearing 25 is filled with pressurized fluid which flows over the foils 12 and can communicate with the bore 25 and the journal 20 through the hydrodynamic aspects of the foil bearing inner diameter.

During shut down, the hydrostatic foil bearing has a wetted surface under pressure which minimizes wear as the journal 20 slows down and stops.

The hydrostatic foil bearing is a combination of the best features of a foil bearing and a hydrostatic bearing. The springs in the foil bearing are replaced by hydrostatic pressure that increases with speed (see FIG. 2). The foils 12 are an enhancement over a typical hydrostatic bearing in that they eliminate rotor to bearing contact during start up and shut down transients which produce small wear scars that can progress to wear the surface of the hydrostatic bearing and potentially degraded performance with repeated starts and shut downs.

The hydrostatic element used to support the outer diameter of the foil 12 has several advantages over the mechanical springs of a typical foil bearing. Mechanical springs are limited in size, and have a very low stiffness because the size limitations. Bearings using hydrostatic pressure on the foils 12 have an increase in pressure from the ambient over a large surface area dictated by the length and diameter of the bearing to produce a restoring force that is relatively large because of the pressure times the area that it acts over. This in series with the hydrodynamic force which is produced by the viscosity of the fluid and the surface speed of the journal 20, work in concert to produce a separating force between the journal 20 and the bearing to increase reaction load capacity. The hydrodynamic control at low speeds converts to a hydrostatic control at high speed as the pressure is developed. The process reverses itself on shutdown. The geometry features in the hydrostatic foil bearings maintain very tight clearances which under high pressure produce viscous damping that will make any perturbation in rotor motion, due to synchronous or non synchronous motion, decay with time and not allow any orbital motion of the journal to increase. The damping is counter to any destabilizing forces that may be present and larger than a conventional foil bearing.

Another advantage of hydrostaticallly supported foil bearings over mechanical spring supported foil bearings is the ease of assembly. Mechanical spring bearings are difficult to install and must be tuned to the loads of the bearing. Hydrostatically supported foils have no parts to install giving the foil support and do not have to be tuned.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A hydrostatic foil bearing comprising:

a housing having a bore on the inside of the housing, a plurality of foils attached to the bore of the housing, a plurality of orifices in the housing for admitting a hydrostatic fluid through the housing to hydrostatically support the foils which hydrodynamically support a journal in the bore.

2. A hydrostatic foil bearing as in claim 1 wherein, each foil has one orifice in the housing for introducing hydrostatic fluid.

* * * * *